G. J. ORR.
King-Bolt Bearings.

No. 158,971. Patented Jan. 19, 1875.

WITNESSES:
A. Bennerendorf
A. F. Terry

INVENTOR:
Gilbert J. Orr
BY
[signature]
ATTORNEYS.

UNITED STATES PATENT OFFICE.

GILBERT J. ORR, OF NEW YORK, N. Y.

IMPROVEMENT IN KING-BOLT BEARINGS.

Specification forming part of Letters Patent No. 158,971, dated January 19, 1875; application filed December 19, 1874.

*To all whom it may concern:*

Be it known that I, GILBERT J. ORR, of the city, county, and State of New York, have invented a new and Improved King-Bolt Bearing and Lubricator, of which the following is a specification:

My invention consists of a bush in the axle-hole for the king-bolt, to take the wear to which the axle itself is subject without it, and be removed for the substitution of a new one when too much worn to save the loss of the axle; and it also consists of a nut for fastening the bush in the axle, and an inverted cup screwing onto this nut to form a cup around the bolt above the axle, to contain absorbent material to be saturated with oil or other lubricating material.

The bottom of the cup has a hole for the king-bolt, considerably larger than the bolt, to allow it the necessary lateral play, and immediately under the bottom is a washer fitted tightly on the bolt, to close the space for preventing the oil from being thrown out, and to exclude the dust to some extent.

In trucks having the body mounted on a fifth-wheel supported on springs considerably above the axle, there is a great deal of endwise motion of the king-bolt in the axle, besides the rotary motion, and these movements often occur when the bolt is cramped or bound against the sides of the hole, so as to cause great wear. There is also a good deal of wear in the axles of all trucks or wagons using a king-bolt, which it is the object of my invention to obviate or lessen as much as possible.

Figure 1:
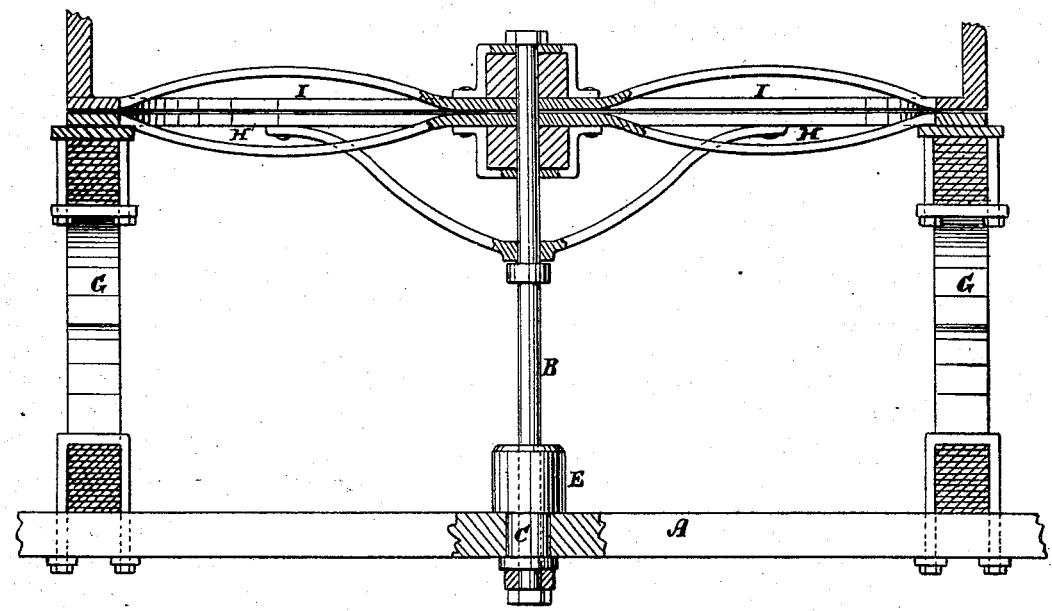
Figure 2:
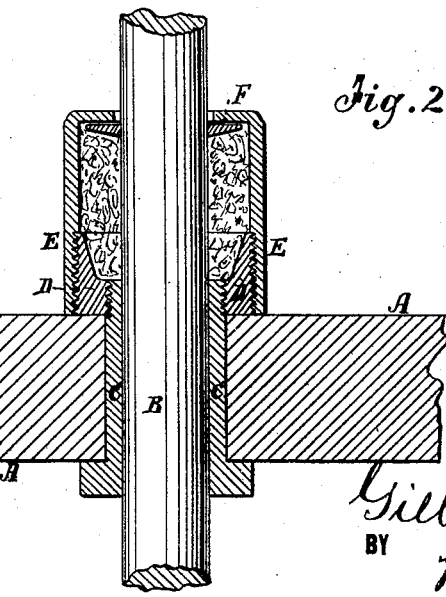

Figure 1 is a transverse section of the front gear of a truck, with my improved bearing and lubricator in the line of the axle; and Fig. 2 is a section of the bearing, lubricator, and axle.

Similar letters of reference indicate corresponding parts.

A is the axle; B, the king-bolt; C, the bush; D, the nut for securing the bush; E, the inverted cup, and F the washer for closing the hole in the bottom of the cup. G represents the springs supporting the fifth-wheel H, through which the king-bolt passes in order to connect the ring I of the body.

By the action of the springs G and other causes the king-bolt plays up and down in the axle, which, together with the oscillating motion caused by the horizontal oscillations of the axle, wears the bolt and the axle, so as to require frequent renewals, which is very expensive, particularly for the axle.

By using the bush C, brass may be used for the bearing-surface, which is better than the iron of the axle, and it can be removed at small expense; and by the addition of the lubricator both the bush and the bolt are largely protected against wear.

Having thus described my invention, I claim as new and desire to secure by Letters Patent—

1. The combination of the bush C with the axle and the king-bolt of a truck, substantially as set forth.
2. The combination of the inverted cup E and nut D with the bush C and the king-bolt, substantially as set forth.
3. The combination of the washer F with the cup E and the king-bolt, substantially as set forth.

GILBERT J. ORR.

Witnesses:
 T. B. MOSHER,
 ALEX. F. ROBERTS.